US007919068B2

(12) United States Patent
Edwards et al.

(10) Patent No.: US 7,919,068 B2
(45) Date of Patent: *Apr. 5, 2011

(54) METHOD FOR MAKING METAL OXIDES

(75) Inventors: Geoffrey Alan Edwards, Coolum Beach (AU); Peter Cade Talbot, Chapel Hill (AU); Jose Antonio Alarco, Indooroopilly (AU)

(73) Assignee: Very Small Particle Company Limited, Wacol (AU)

( * ) Notice: Subject to any disclaimer, the term of this patent is extended or adjusted under 35 U.S.C. 154(b) by 322 days.

This patent is subject to a terminal disclaimer.

(21) Appl. No.: 11/490,529

(22) Filed: Jul. 21, 2006

(65) Prior Publication Data
US 2007/0031322 A1 Feb. 8, 2007

Related U.S. Application Data

(63) Continuation of application No. PCT/AU2005/000081, filed on Jan. 24, 2005.

(60) Provisional application No. 60/538,867, filed on Jan. 23, 2004, provisional application No. 60/582,905, filed on Jun. 25, 2004.

(51) Int. Cl.
C01C 1/00 (2006.01)
(52) U.S. Cl. ............. 423/593.1; 423/604; 423/605; 423/608
(58) Field of Classification Search .......... 423/263, 423/593.1, 326–335, 700–718; 428/34.5; 502/73; 422/323
See application file for complete search history.

(56) References Cited

U.S. PATENT DOCUMENTS

| 3,916,585 | A  | * | 11/1975 | Barks .................. 51/309 |
| 4,356,113 | A  | * | 10/1982 | Lim et al. ............ 502/68 |
| 4,448,896 | A  | * | 5/1984  | Kageyama et al. .... 502/314 |
| 4,508,841 | A  | * | 4/1985  | Onuma et al. ........ 502/73 |
| 4,628,042 | A  | * | 12/1986 | Speronello .......... 502/263 |
| 5,358,695 | A  | * | 10/1994 | Helble et al. ........ 423/263 |
| 6,660,680 | B1 | * | 12/2003 | Hampden-Smith et al. .. 502/180 |
| 6,752,979 | B1 | * | 6/2004  | Talbot et al. ........ 423/592.1 |
| 6,780,393 | B2 | * | 8/2004  | Murayama et al. .... 423/592.1 |
| 6,830,822 | B2 | * | 12/2004 | Yadav ............... 428/552 |

(Continued)

FOREIGN PATENT DOCUMENTS

CN 1448371 10/2003

(Continued)

*Primary Examiner* — Stuart Hendrickson
*Assistant Examiner* — Richard M Rump
(74) *Attorney, Agent, or Firm* — Winston & Strawn LLP

(57) ABSTRACT

A method of producing porous complex oxides includes the steps of providing a mixture of a) precursor elements suitable to produce the complex oxide; or b) one or more precursor elements suitable to produce particles of the complex oxide and one or more metal oxide particles; and c) a particulate carbon-containing pore-forming material selected to provide pore sizes in the range of approximately 7 nm to 250 nm, and treating the mixture to (i) form the porous complex oxide in which two or more of the precursor elements from (a) above or one or more of the precursor elements and one or more of the metals in the metal oxide particles from (b) above are incorporated into a phase of the complex metal oxide and the complex metal oxide has grain sizes in the range of about 1 nm to 150 nm; and (ii) remove the pore-forming material under conditions such that the porous structure and composition of the complex oxide is substantially preserved. The method may be used to produce non-refractory metal oxides as well.

13 Claims, 3 Drawing Sheets

Pore size distributions for the metal oxides produced in examples 1 and 2.

U.S. PATENT DOCUMENTS

| | | | |
|---|---|---|---|
| 2005/0226805 A1* | 10/2005 | Domen et al. | 423/592.1 |
| 2005/0266297 A1* | 12/2005 | Irvine et al. | 429/40 |
| 2005/0272592 A1* | 12/2005 | Pinnavaia et al. | 502/60 |
| 2006/0052241 A1* | 3/2006 | Airiau et al. | 502/304 |
| 2006/0088714 A1* | 4/2006 | Zaghib et al. | 428/404 |
| 2006/0199724 A1* | 9/2006 | Lee et al. | 502/60 |

FOREIGN PATENT DOCUMENTS

| | | |
|---|---|---|
| JP | 63-21206 | 1/1988 |
| JP | 2001-212467 | 8/2001 |
| JP | 2003-313011 | 11/2003 |
| WO | WO 94/16989 A1 | 8/1994 |

* cited by examiner

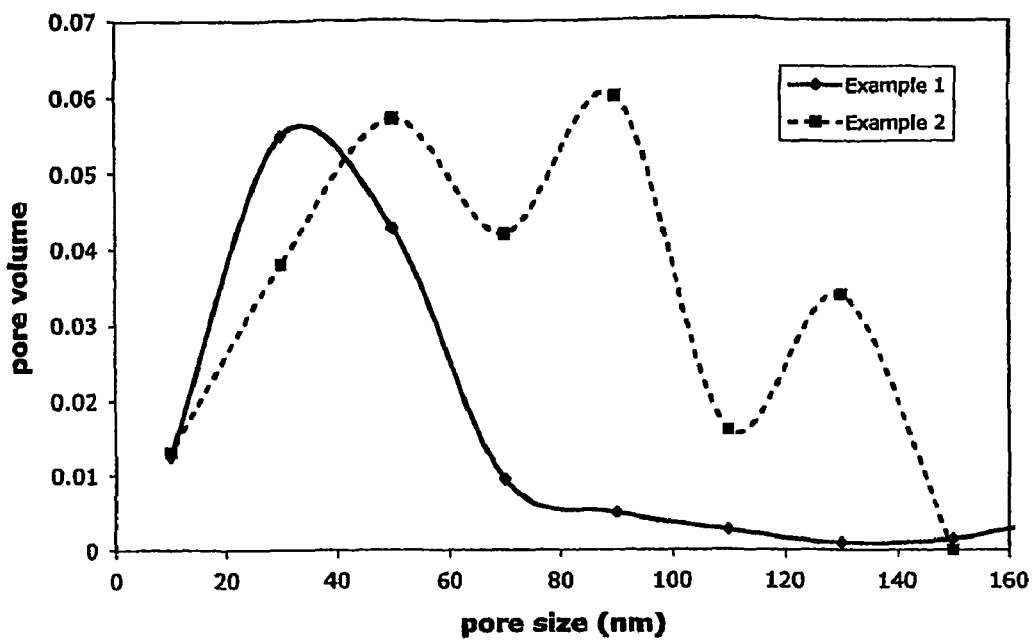
Figure 1. Pore size distributions for the metal oxides produced in examples 1 and 2.
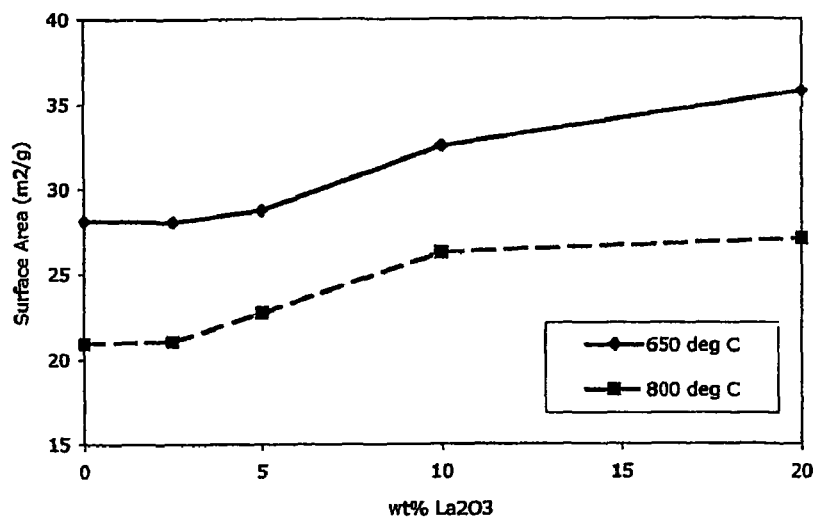
Figure 2. Effect of incorporating a second $La_2O_3$ phase on surface area.

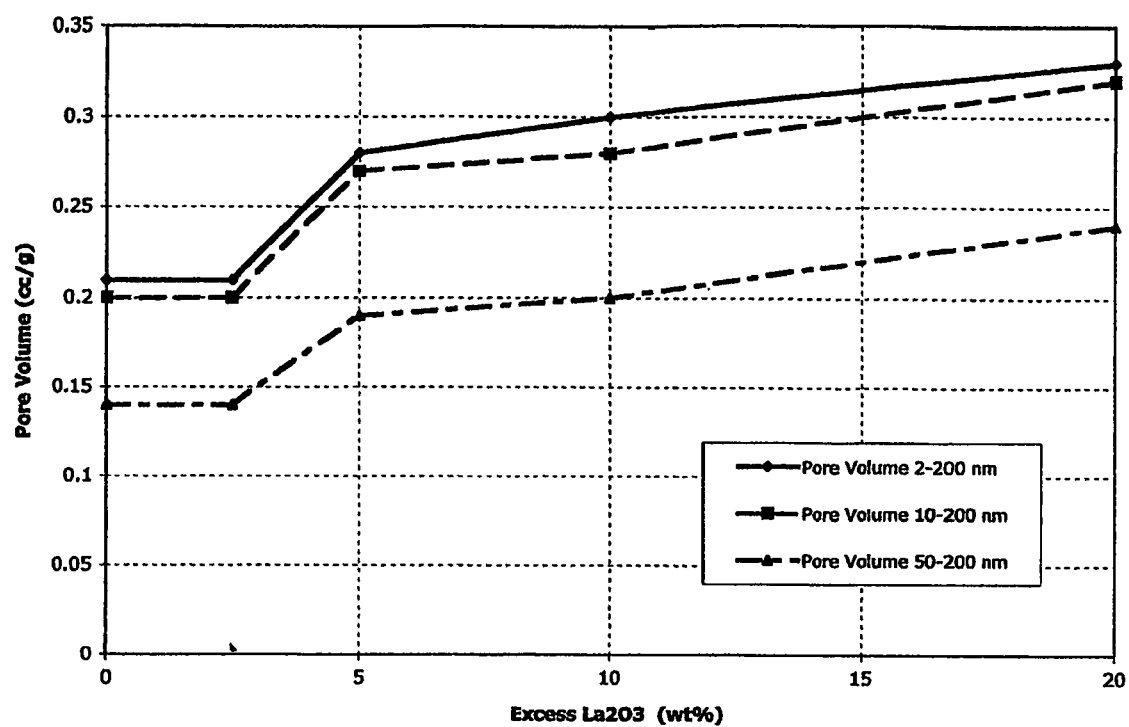
Figure 3. Effect of excess $La_2O_3$ on pore volumes.

METHOD FOR MAKING METAL OXIDES

CROSS-REFERENCE TO RELATED APPLICATIONS

This application is a continuation of International application PCT/AU2005/000081 filed Jan. 24, 2005, which claims the benefit of provisional application 60/538,867 filed Jan. 23, 2004 and 60/582,905 filed Jun. 25, 2004. The entire content of each earlier application is expressly incorporated herein by reference thereto.

FIELD OF THE INVENTION

The present invention generally relates to complex oxide materials. Complex oxides are oxides that contain two or more different metallic elements. They are useful for a variety of purposes, including as catalysts and a wide range of electronic materials. In preferred embodiments, the invention relates to a method for making porous complex oxides with improved high temperature stability. In another aspect, the present invention also relates to a method for making porous non-refractory oxides.

DESCRIPTION OF RELATED ART

In general, the crystal structures of oxides containing several different metallic elements are more complex than those of simple oxides such as $Al_2O_3$ and $SiO_2$. In addition, achieving phase purity (i.e., the presence of a desired crystal phase or phases and the absence of undesired phases) in these complex compounds is typically very difficult. This is because these complex crystal structures are very sensitive to variations in chemical composition.

It follows therefore, that to achieve uniform and consistent properties critical to many applications, it is necessary to ensure a homogeneous dispersion of elements that lead to the desired purity of the complex oxide. One difficulty that arises in achieving such a homogeneous distribution of elements is the different ways in which individual elements can behave during processing.

For example, precipitation and reaction rates may vary widely for each element, causing segregation in methods such as co-precipitation and sol-gel processing. Different elements can also respond very differently to temperature and atmosphere. For example, many metallic elements used to form complex oxides have relatively low melting points. If a sufficiently reducing atmosphere is present during heat treatment, these elements may be present in metallic rather than oxide form, and melt. Such melting can lead to severe segregation, the extensive formation of impurity phases, and loss of surface area.

Despite these difficulties various methods for production of complex oxides are known in the art. Such methods include:

'Shake and bake';
Co-precipitation;
Thermal evaporative and spraying techniques; and
Polymer-complexing methods.

Sol-gel 'Shake and bake' methods are the crudest and simplest. An example is described in U.S. Pat. No. 5,932,146. Different oxide powders, each containing one or more required elements, are simply mixed together, ground and then fired at high temperatures to enable homogenous mixing of different elements via diffusion. The problem with this method is that the starting material is very inhomogeneous; very high sintering temperatures are therefore required to obtain homogeneity. Often intermediate grinds are also necessary. High sintering temperatures greatly diminish surface area, and long sintering times, high temperatures and intermediate grinds lead to very high processing costs. It may not even be possible to obtain some desired phases and phase purities using this method.

The majority of thermal evaporative and spraying techniques have more relevance to the production of oxide films or coatings. These include techniques such as gas condensation processing, chemical vapour condensation, plasma spray and spray pyrolysis. The most important of these techniques for bulk processing is spray pyrolysis (Messing et al. 1994).

Spray pyrolysis is a process for producing powders of metals or oxides by the thermal decomposition of metal salts or organometallic solutions. The solutions are first converted to aerosols by passing through atomising spray nozzles or through ultrasonic transducers. The aerosol is then sprayed into a heated zone or onto a heated surface sufficiently hot to cause evaporation of the solvent and subsequent precipitation of the metal or oxide.

Generally, in a spray pyrolysis process, changing aerosol decomposition parameters by varying reaction temperature and carrier gas composition are basic operating variables. In addition, solution properties such as precursor composition, concentration, or the addition of a co-solvent may be crucial to achieve the desired product composition and morphology. Limitations of the spray pyrolysis process include difficulty in controlling phase proportions, low production rates and formation of low-density hollow particles.

Polymer-complex methods can also provide reasonably homogeneous distributions of elements for relatively simple oxides. An example for La-based perovskites is described in *Key Engineering Materials*, 206-213, pp 1349-52, 2002 (Popa & Kakihana). The main problem with such methods is that the polymers used can be prone to exothermic firing. This can make processing difficult. Also, for multi-element compounds, some elements may not complex with the polymer, and therefore a homogeneous distribution of elements cannot be obtained.

Sol-gel methods generally require carefully controlled processing conditions to form homogeneous precursors. Examples of sol-gel methods for La—Ca—Mn perovskites are described in *J. Sol-Gel Science and Technology* 25, pp 147-157, 2002 (Mathur & Shen), and *Chemistry of Materials* 14, pp 1981-88, 2002 (Pohl and Westin). Sol-gel can become extremely difficult as the complexity of the compounds increase, and some elements are simply not suitable to sol-gel methods at all. Sol-gel is typically difficult to scale up and the required raw materials can be very expensive.

U.S. Pat. No. 6,752,979 in the name of the present applicants describes a method for producing complex metal oxides with homogeneously distributed elements. This method has been proven for a wide range of different complex oxides. The method provides phase-pure oxides with high surface areas, using low processing temperatures.

In addition to correct oxide crystal structure and homogenous distribution of elements, in many applications the porosity that exists between sintered grains of oxide is very important to performance. Larger, interconnected pores (>~1 μm) are typically desirable for applications that require good fluid (gas or liquid) transfer. For example, methods are known that can provide large pores in oxides for solid oxide fuel cell electrodes (e.g. U.S. Pat. Nos. 4,883,497 and 6,017,647). Most of these methods use various pore-formers, i.e. materials that can be leached or burned out of the ceramic material. The pore formers are typically greater than 1 μm to enable pores of this size to form. Pores of this size are too big to significantly increase the surface area of a material.

Materials with a substantial number of small pores (<~7 nm) generally exhibit high surface areas. High surface areas can be useful in applications that utilize surface properties such as catalysis. Small pores and high surface areas can be obtained if the structure consists of numerous very small particles that are loosely packed together. Various organic pore formers can also be used to form very small pores. Small pores generally do not survive at higher temperatures, and therefore typically result in low high temperature stability.

Pores in the 'intermediate' size range (~7 nm to ~250 nm) may also be useful for improving fluid flow, and are small enough to contribute significantly to surface area. They have been thought to improve the high temperature stability of some simple metal oxides. U.S. Pat. No. 6,139,814 describes a method for making Ce-based oxides with improved high temperature stability. Whilst the reason for the thermal stability is not known for certain, the patent speculates that the stability is owed, at least in part, to the presence of average pore sizes that lie in the 'mesoscale' range (example shows average pore size around 9 nm). The method of '814 involves absorbing a liquid solution of metal ions into the pores of a structured cellulosic material, e.g. filter paper. The liquid is dried, and the material fired to remove the cellulose. Thus the solid forms in the pores of the cellulose, and the pores of the cellulose 'pattern' the solid. This method, however, has several disadvantages. Very high organic:metal oxide ratios are used (up to >100:1), which, together with the relatively high cost of suitable cellulose materials, result in expensive processing. Absorption of liquid into solids like paper is also a clumsy process to scale up. Finally, simply drying out solutions of metal ions to form solids is not ideal for creating the homogeneous distributions of different elements that are required for more complex materials.

A method for preparing silica with pores around the 10 nm size range is described in *J. Porous Materials* 7, p 435-441, 2000 (Ermakova et al.). Various carbon matrices were impregnated with a silica gel, and dried then burned out. Increased pore sizes were obtained using this method. Improved thermal stabilities were obtained when catalytic filamentous carbon was used as the source of carbon. Pores from other, more spherical carbon particles were not tested for thermal stability. Unfortunately the sol-gel method used is not desirable for forming many perovskite materials, particularly at commercial scale. Also, impregnation of solids is an awkward method to scale up. Another problem is that the ratio of carbon material to oxide is quite high (up to 30). This increases the expense of production, decreases production rates, and exacerbates problems with impurity elements in the carbon.

U.S. Pat. No. 4,624,773 describes a process for catalytic cracking of hydrocarbon feedstock. Part of the process is to make alumino-silicate materials with pores preferably from 100 to 600 nm to improve the flow of gas into the catalyst. The method involves making a gel of alumina and silica, and mixing in reticulated carbon particles having length of about 50 to 3000 nm. After the alumino-silicate solid is formed, carbon particles are burned out to form pores in the desired size range. This method requires that the smaller pores in the alumino-silicate zeolite structures, that provide high surface areas, are unaffected by the burnout.

The gel technique used in this method to form the alumino-silicate solid is not suited to more complex materials that require higher chemical homogeneity, particularly at commercial scale. Also, the pores created to maximize gas flow are larger than that required to create thermally stable surface area. Finally, carbon is a strong reducing agent and is extensively used in minerals processing to reduce oxides to metal. While this may not be an issue with oxides of aluminium and silicon, since these oxides are very stable and difficult to reduce, the oxides of many other metals, including metals commonly used in complex oxides, are more likely to be reduced by carbon. The reducibility of different elements is commonly represented in Ellingham Diagrams. Oxides towards the bottom of the diagram, such as Al are difficult to reduce, while those at the top are much easier to reduce. Metals such as iron, nickel, cobalt, manganese, chromium and potassium are much more reducible than Al. Ellingham diagrams also show the reducing effects of carbon, and particularly of carbon monoxide in the heat treatment atmosphere.

In processing of complex oxides, particularly heat treatment, the presence of metals can create severe difficulties due to segregation and/or inability to form required oxide phases with other elements. Therefore it is not clear whether intimate mixtures of carbon particles and oxides or oxide precursors at mesoscale will allow proper development of required phases. Also, the presence of metals or other reduced oxide forms can greatly increase sintering, leading to severe loss of surface area and poor thermal stability.

An example of the problems associated with incorporation of carbon-based material into oxide precursors in outlined in *J. of Materials Science* 35 (2000), p 5639-5644, which describes a method for forming $La_{0.8}Sr_{0.2}CoO_3$ material using cellulose which was burned out. It was found that if carbon dioxide was not removed quickly enough, carbonates would form in the bulk and hence much higher calcination temperatures were needed to obtain phase purity.

GB 2 093 816 by Asia Oil Company Ltd and Mitsubishi Chemical Industries Ltd describes a method for producing a porous refractory inorganic oxide product. GB 2 093 816 provides a porous refractory inorganic oxide product which has a pore distribution having a clear peak between 10 nm and 100 nm in diameter and a pore capacity (porosity) of 0.11 cc/g or more between 10 nm and 50 nm in radius which is obtained by shaping a mixture of carbon black and a refractory inorganic oxide and/or a precursor of refractory inorganic oxide, drying a product, firing it in an oxygen-containing gas flow while burning said carbon black.

It is apparent that GB 2 093 816 is limited to producing refractory inorganic oxide products. The typical refractory inorganic oxides used in GB 2 093 816 include inorganic oxides such as alumina, silica, titania, zirconia, thoria, boria, zeolite and clay. The actual examples given in GB 2 093 816 only show the formation of refractory inorganic oxides incorporating alumina, silica, titania, silica alumina, boria, zeolite, kaoline, and sepiolite.

The examples given in GB 2 093 816 all used solid particulate starting materials to obtain mixed oxide products, except for Example 10, which used titanium tetrachloride as a precursor for a precipitation reaction to form titania. The product of example 10 was titania, not a mixed oxide.

GB 2 093 816 used carbon black having an average diameter of 15-300 nm. GB 2 093 816 also states that the final firing temperature in the step of burning out the carbon black is about 500° C. or higher, [but] the upper limit is not critical as far as the porous refractory inorganic oxide product does not lose the activity for the support or catalyst.

The processing conditions and starting materials used in GB 2 093 816 would require relatively high processing temperatures to obtain a complex oxide matrix which included a mixture of metals. Such processing conditions are clearly not disclosed in GB 2 093 816, confirming that complex metal oxide phases would not be formed. Consequently, the present inventors believe that the so-called mixed inorganic oxides formed in GB 2 093 816 would, in fact, consist of a mixture of separate grains or particles of the feed materials, with each separate grain or particle incorporating only one of the feed materials therein. Thus, GB 2 093 816 does not produce complex metal oxide phases that include two or more of the separate metals from the different precursor ingredients used to form the particles.

Review of the prior art highlights the absence of a proven, commercially viable method for producing complex metal oxide materials with pores in the size range of approximately 7 nm to 250 nm.

There is also great need for complex oxide materials with improved thermal stability, and a method of manufacturing such materials.

BRIEF DESCRIPTION OF THE INVENTION

In a first aspect the present invention provides a method of producing porous complex oxides, the method including providing a mixture of
  a) precursor elements suitable to produce the complex oxide; or
  b) one or more precursor elements suitable to produce particles of the complex oxide and one or more metal oxide particles; and
  c) a particulate carbon-containing pore-forming material selected to provide pore sizes in the range of approximately 7 nm to 250 nm,
  and treating the mixture to
  i) form the porous complex oxide in which two or more of the precursor elements from (a) above or one or more of the precursor elements and one or more of the metals in the metal oxide particles from (b) above are incorporated into a phase of the complex metal oxide and the complex metal oxide has grain sizes in the range of about 1 nm to 150 nm; and
  ii) remove the pore-forming material under conditions such that the porous structure and composition of the complex oxide is substantially preserved.

Unlike the method described in GB 2 093 816 which leads to the formation of metal oxide phases that simply mirror the phases of the metal oxide particles used as feed particles in that process or which produces a metal oxide phase containing only a single refractory metal from a precursor element, the process of the present invention produces a complex metal oxide phase that incorporates two or more metals (and in some embodiments, many more than two metals) from the precursors or from the precursors and metal oxide particles used as feed materials into the metal oxide phase. It will be understood that the metal oxide phase comprises a matrix of the metal oxide, with the matrix comprising an oxide structure incorporating the two or more metals. Suitably, the two or more metals are homogeneously distributed throughout the complex metal oxide phase.

Suitably, a single phase complex metal oxide is formed. However, the present invention also encompasses the formation of a phase of a complex metal oxide and one or more phases of other metal oxides, or the formation of two or more complex metal oxide phases, either with or without any other metal oxide phases being formed. More suitably, each complex metal oxide phase that is formed is a phase pure phase, that is, that phase includes only the desired crystal phase and the absence of undesired crystal phases.

The complex metal oxide may contain two or more metals, such as two or metals selected from the group consisting of metals of atomic number 3, 4, 11, 12, 19 to 32, 37 to 51, 55 to 84 and 87 to 103. In one embodiment, the two or more metals in the complex metal oxide may include at least one non-refractory metal, such as at least one metal selected from those metals of atomic number 3, 4, 11, 19-21, 23-32, 37-39, 41-51, 55-84 and 87-103. In this embodiment, the metal oxide, in addition to containing the non-refractory metals specified above, may also contain other metals such as Ti, Al, Zr, and Mg.

It has surprisingly been found that the porous complex oxides so formed exhibit significantly increased pore volume or surface area with enhanced high temperature stability, such as enhanced high temperature stability in the temperature range of approximately 750° C. to 1000° C. The complex oxides suitably further exhibit a substantially homogeneous composition within each phase. Applicants have surprisingly found that complex oxides formed with grain sizes in the above range, together with pore sizes in the above range, have high initial surface areas combined with increased thermal stability of surface area.

Applicants have found that if the grain size of the complex oxide is greater than 150 nm, then the material may not have sufficient surface area. Similarly if the pore sizes are greater than approximately 250 nm, sufficient surface area may not be obtained after high temperature ageing. If the pore size is less than approximately 10 nm, high surface area may be obtained, however the pores and therefore surface area may not be thermally stable at elevated temperature.

Unlike GB 2 093 816, the method of the present invention can be used to form non-refractory complex metal oxide phases. The present inventors have surprisingly found that the method of the present invention does not have to be restricted to producing refractory oxides that are difficult to reduce. In contrast, all of the examples of GB 2 093 816 produce oxide phases of alumina, silica, titania, silica-alumina, boria, zeolite, kaoline, or sepiolite. All of these metal oxide phases are extremely unreactive and very difficult to reduce with carbon.

In this aspect of the present invention, the complex oxides so formed may be of any suitable type. The complex metal oxide phase may be a perovskite. The crystal structure is that of the mineral 'Perovskite', chemical formula $CaTiO_3$. There are numerous different compounds with the perovskite crystal structure, including $SrTiO_3$, $YBa_2Cu_3O_x$ superconductor, and many La-based perovskites that are useful as catalysts and as electrodes in solid oxide fuel cells. La-based perovskites Include $LaMnO_3$, $LaCoO_3$, $LaFeO_3$, and $LaGaO_3$ Various substitutions of different elements into the oxide lattice may be made to obtain desired physical properties. For example with perovskites, substitutions may be on the A site (e.g. Sr for La in $LaMnO_3$) and/or on the B site (e.g. Ni for Mn in $LaMnO_3$). Multiple elemental substitutions on either or both sites can be made to further tailor physical properties for specific applications. For example, a perovskite composition $(Ln_{0.2}La_{0.4}Nd_{0.2}Ca_{0.2})(Mn_{0.9}Mg_{0.1})O_3$, where Ln is approximately $La_{0.598}Nd_{0.184}Pr_{0.81}Ce_{0.131}Ca_{0.002}Sr_{0.004}$, is described in U.S. Pat. No. 5,932,146 as being useful for solid oxide fuel cell electrodes.

There are numerous other examples of complex oxides that are being developed for a wide range of applications and the present invention is equally applicable thereto.

The precursor elements useful in the mixture of the present invention may be of any suitable type, depending on the complex oxide to be formed. Any suitable source of metals and metal cations may be used. Mixtures of metals and metal compounds including one or more of oxides, acetates, carbonates, nitrates and the like may be used.

The mixture of precursor elements, or complex oxide, and pore-forming material may be of any suitable type. The mixture may be a solid phase mixture, or formed as a solution, dispersion or the like.

In one embodiment the precursor elements and pore-forming material may be mixed to form a solid phase mixture and the complex oxide being subsequently formed by suitable heat treatment, as discussed below.

In a further embodiment, complex oxide particles may be formed from suitable precursor elements and the pore-forming material mixed with the complex oxide particles to form a mixture.

The mixture may alternatively be provided as a solution or dispersion. For example, a solid phase mixture may first be formed and then dispersed or dissolved in a suitable solvent.

In a further embodiment, the precursor element mixture may first be formed in solution and the pore-forming material subsequently added to the solution. Alternatively the precursor elements and at least a portion of pore-forming material may be mixed to form a solid phase mixture and the mixture dissolved in a suitable solvent.

Most suitably, the pre-cursor elements form part of a solution that is mixed with the pore forming material and the metal oxide particles (if used).

Where a dispersion or solution is formed, any suitable solvent may be used. Although inorganic and organic solvents, such as acids (e.g. hydrochloric or nitric acid), ammonia, alcohols, ethers and ketones may be used, water is the preferred solvent.

The mixture may preferably include a surfactant. The surfactant may be of any suitable type. A surfactant of the type described in International patent application publication number WO 02/42201, to applicants, the entire disclosure of which is incorporated herein by reference, have been found to be suitable.

Some examples include Brij $C_{16}H_{33}(OCH_2CH_2)_2OH$, designated $C_{16}EO_2$, (Aldrich); Brij 30, $C_{12}EO_4$, (Aldrich); Brij 56, $C_{16}EO_{10}$, (Aldrich); Brij 58, $C_{16}EO_{20}$, (Aldrich); Brij 76, $C_{18}EO_{10}$, (Aldrich); Brij 78, $C_{16}EO_{20}$, (Aldrich); Brij 97, $C_{18}H_{35}EO_{10}$, (Aldrich); Brij 35, $C_{12}EO_{23}$, (Aldrich); Triton X-100, $CH_3C(CH_3)_2CH_2C(CH_3)_2C_6H_4(OCH_2CH_2)_xOH$, x=10(av), (Aldrich); Triton X-114, $CH_3C(CH_3)_2CH_2C(CH_3)_2$ $CH_4(OCH_2CH_2)_5OH$ (Aldrich); Tween 20, poly(ethylene oxide) (20) sorbitan monokayrate (Aldrich); Tween 40, poly(ethylene oxide) (20) sorbitan monopalmitate (Aldrich); Tween 60, poly(ethylene oxide) (20) sorbitan monostearate (Aldrich); Tween, poly(ethylene oxide) (20) sorbitan monooleate (Aldrich); and Span 40, sorbitan monopalmitate (Aldrich), Terital TMN 6, $CH_3CH(CH_3)CH(CH_3)$ $CH_2CH_2CH(CH_3)(OCH_2CH_2)_6OH$ (Fulka); Tergital TMN 10, $CH_3CH(CH_3)CH(CH_3)CH_2CH_2CH(CH_3)(OCH_2CH_2)_{10}$ OH (Fulka); block copolymers having a poly(ethylene oxide)-poly(propylene oxide)-poly(ethylene oxide) (EO-PO-EO) sequence centered on a (hydrophobic) poly(propylene glycol) nucleus terminated by two primary hydroxyl groups; Pluronic L121 ($_{Mav}$=4400), $EO_6PO_{70}EO_5$ (BASF); Pluronic L64 ($_{Mav}$=2900), $EP_{13}PO_{30}EO_{13}$ (BASF); Pluronic P65 ($_{Mav}$=3400), $EP_{20}PO_{30}EO_{20}$ (BASF); Pluronic P85 ($_{Mav}$=4600), $EO_{26}PO_{39}EO_{26}$ (BASF); Pluronic P103 ($_{Mav}$=4950), $EO_{17}PO_{56}EO_{17}$ (BASF); Pluronic P123 ($_{Mav}$=5800), $EO_{20}PO_{70}EO_{20}$, (Aldrich); Pluronic F68 ($_{Mav}$=8400), $EO_{80}PO_{30}EO_{80}$ (BASF); Pluronic F127 ($_{Mav}$=12 600), $EO_{106}PO_{70}EO_{106}$ (BASF); Pluronic F88 ($_{Mav}$=11 400), $EO_{100}PO_{39}EO_{100}$ (BASF); Pluronic 25R4 ($_{Mav}$=3600), $PO_{19}EO_{33}PO_{19}$ (BASF); star diblock copolymers having four $EO_n$—$PO_m$ chains (or in reverse, the four $PO_n$-$EO_m$ chains) attached to an ethylenediamine nucleus, and terminated by secondary hydroxyl groups; Tetronic 908 ($_{Mav}$=25 000), $(EO_{113}PO_{22})_2NCH_2CH_2N$ $(PO_{113}EO_{22})_2$ (BASF); Tetronic 901 ($_{Mav}$=4700), $(EO_3PO_{18})_2$ $NCH_2CH_2N(PO_{18}EO_3)_2$ (BASF); and Tetronic 90R4 ($_{Mav}$=7240), $(PO_{19}EO_{16})_2$ $NCH_2CH_2N(EO_{16}PO_{19})_2$ (BASF).

The above surfactants are non-ionic surfactants. Other surfactants that can be used include:
Anionic Surfactant:
Alcohol Ethoxycarboxylates (R—(O—CH2-CH2)x-O—CH2—CH2-OH) (NEODOX AEC)
Alkyl Ethoxy Carboxylic Acids (R—(O—CH2-CH2)x-O—CH2-CO2H) (EMPICOL C)
Sodium dodecyl sulfate $CH_3(CH_2)_{11}OSO_3NA$
There appears to be several manufacturers. Sigma is an example.
Cationic Surfactants:
Cetyltrimethylammonium chloride $CH_3(CH_2)_{15}N(CH_3)_3Cl$ Aldrich
Cetyltrimethylammonium bromide $CH_3(CH_2)_{15}N(CH_3)_3BT$ Aldrich
Cetylpyridinium chloride $C_{21}H_{36}NCl$ Sigma.
This list should not be considered to be exhaustive.

The pore-forming particles may be of any suitable type. The particles should be of a suitable size to generate pore sizes in the "intermediate range" (e.g. pores of diameter approximately 7 nm to approximate 250 nm, preferably approximately 10 nm to approximately 150 nm). Pore-forming particles in the range of approximately 7 nm to 300 nm, preferably approximately 10 nm to 150 nm, more preferably approximately 10 nm to approximately 100 nm, may be used. Carbon particles, preferably carbon black particles, are preferred.

The carbon-containing particles used as pore formers in the method of the present invention are believed to facilitate formation of pores of the desired size range by providing regions where the precursors/precursors and metal oxide particles are prevented from residing whilst the complex metal oxide phase or phases are formed, followed by subsequent removal of the pore forming particles. Thus, nano-scale pore forming particles are required. This should be distinguished from other methods which use porous carbon-containing substrates (such as filter paper or activated carbon) to adsorb liquid phase precursor mixtures followed by removal of the substrate. The size of the substrates used in those methods are typically many orders of magnitude larger than the size of the pore forming particles used in the present invention. Such prior art methods are very difficult to scale up beyond laboratory scale.

In an especially preferred embodiment of the present invention, carbon black is used as the pore forming particles.

The pore-forming particles are preferably removed by heat treatment.

The components required to form the complex oxide should be homogeneously dispersed to form the mixture of precursor elements. The elements may be mixed by any suitable method known in the prior art. The pore-forming particles should also be dispersed in the mixture, using methods known in prior art including high-speed shearing devices, ultrasonic equipment, roll mills, ball mills, sand mills and the like. Applicants have found that better dispersion of carbon-containing pore forming particles at this stage results in more carbon-containing pore forming particles being intimately mixed with the precursor, and thus more pores being present in the desired size range. In a further preferred embodiment, air is removed from the carbon-containing pore forming particles by vacuum, prior to mixing with the liquid. The liquid is then mixed with the carbon using dispersion methods. This leads to even better dispersions of carbon particles in the solution, intimate mixing of even more carbon particles in the precursor, and more pores in the preferred size range.

The pore-forming particles may, in whole, or in part, be included in the mixture prior to dispersion.

The treating of the mixture to form the complex oxide may be of any suitable type which will provide a complex oxide having a substantially homogeneous composition.

The porous complex oxide formation may accordingly, in one embodiment, include two basic steps:
1. Production of particles that are comprised of a mixture of a complex oxide or complex oxide precursor elements and carbon particles.
2. Heat treatment of the particles from step (1) to form the desired oxide phase from the precursor if a precursor is used, and to substantially remove (e.g. burn out) the carbon particles to create pores.

Steps (1) and (2) may take place sequentially or contemporaneously.

In step 1, the elements in the oxide precursor should be homogeneously dispersed. If they are not homogeneously dispersed, very high temperatures may be required to evenly disperse the elements and form the correct phase, and such temperatures can decrease the amounts and sizes of pores, or eliminate pores altogether. If the elements are substantially inhomogeneous, required phases and/or phase purities, and grains in the correct size range, will not be attainable.

At least some of the carbon particles should preferably be intimately mixed with the oxide or oxide precursor. If no carbon particles are intimately mixed with the oxide or oxide precursor, and instead the carbon particles are present merely as large agglomerates with no oxide or oxide precursor within the agglomerates, then pores of the correct size may not form. The size of the carbon particles, and the volume of these particles, may be chosen to suit the desired pore size and pore volume.

Any method suitable for producing oxides or oxide precursors with a substantially homogeneous distribution of elements may be used in the method of the present invention, provided that carbon particles of the right size may be added to the method, so that at least some of the carbon particles are intimately mixed with the precursor, and that the method can produce the oxide with the correct grain size.

Accordingly, in a preferred embodiment of the present invention, the method further includes the preliminary steps of providing a solution of complex oxide precursor elements including metal cations, a source of carbon particles and a non-ionic, cationic or anionic surfactant, mixing the solution, surfactant and carbon particles such that surfactant micelles are formed and the mixture forms a substantially homogeneous dispersion and heating the mixture to form the complex metal oxide under conditions in which the carbon particles are substantially removed.

In a further preferred embodiment, an oxide precursor may be prepared according to the method described in U.S. Pat. No. 6,752,979 to applicants, the entire disclosure of which is incorporated herein by reference. This method consists of the following steps:
a) preparing a solution containing one or more metal cations;
b) mixing the solution from step (a) with surfactant under conditions such that surfactant micelles are formed within the solution to thereby form a micellar liquid; and
c) heating the micellar liquid from step b) above to form metal oxide, the heating step being undertaken at a temperature and for a period of time to remove the surfactant and thereby form metal oxide particles having a disordered pore structure.

In a preferred embodiment of the present invention, carbon black particles are added either to the solution from a), or the mixture from b), and the heat treatment also substantially removes (burns out) the carbon particles. Preferably the carbon particles are added to the solution of step a), prior to mixing.

In a further preferred embodiment, carbon particles are intimately mixed with the solution of cations in step a), or with the mixture from step b), or both, by methods as discussed above. Preferably, the carbon black particles are dispersed within the initial solution and/or the solution-surfactant mixture by either high-speed shearing, sonication, vacuuation of the particles prior to addition to liquid, or a combination of these.

In a further preferred embodiment, the mixture of complex oxide and carbon particles may be provided by mixing the carbon particles with complex oxide particles, the complex oxide particles have a size range similar to or smaller than the target grain size.

Alternatively, or in addition, the complex oxide may be formed utilizing the methods known in the art. The complex oxide may be produced utilizing a polymer-complex method, a co-precipitation method or sol-gel method, thermal evaporative method, hydrothermal method or any other suitable method or combination thereof. Examples of such methods are given in U.S. Pat. No. 6,139,816 (Liu et al), U.S. Pat. No. 5,879,715 (Higgens et al), U.S. Pat. No. 5,770,172 (Linehan et al), U.S. Pat. No. 5,698,483 (Ong et al), U.S. Pat. No. 6,328,947 (Monden et al), U.S. Pat. No. 5,778,950 (Imamura et al) and US patent application publication No. 2005/0008777 (McCleskey et al). The entire disclosure of the above referenced patents and patent applications are herein incorporated by cross reference. The method of the first aspect of the present invention is especially suitable for use in methods for making metal oxides in which a solution containing one or more precursors is mixed with a surfactant or a polymer and is subsequently treated, typically by heating, to form the complex metal oxide.

The heat treatment step in the method of the present invention may be carried out using any suitable equipment known in the art, for example: tube, belt or muffle furnaces, fluid bed furnaces, multiple hearth furnaces, rotary calciners, heated substrates, thermal sprays, spray calciners, etc.

If the oxide or oxide precursor consists of individual particles that are not connected, then the heat treatment should be such that some connections form between the particles prior to carbon burnout. If this network is not formed prior to carbon burnout, the pores will collapse.

The heat treatment then removes ("burn out") the carbon to create the pores, and transforms the oxide precursor to the desired oxide crystal structure.

The heating step results in the formation of the metal oxide and the pore structure of the particles. Unlike prior art processes for producing complex metal oxides, the method of the present invention suitably only requires a relatively low applied temperature. Indeed, applied temperatures of less than about 350° C. have been found to be suitable in experimental work conducted to date. Preferably, the maximum applied temperature reached in step (c) does not exceed about 750° C., more preferably about 650° C., most preferably about 300° C.-350° C.

The heating step may involve a rapid heating to the maximum desired temperature, or it may involve a much more closely controlled heat treatment regime.

Accordingly, in a further preferred embodiment of the present invention, the heat treatment step includes subjecting the dispersion to a heat treatment profile over a predetermined time to a desired maximum temperature.

For example, the heating step may be carried out under a controlled atmosphere. The heating step may involve heating to a drying temperature (generally below the boiling temperature of the mixture) to dry the mixture, followed by a slow ramp up to the maximum applied temperature, or followed by a series of incremental increases to intermediate temperatures before ultimately reaching the maximum applied temperature. The duration of the heating step may vary widely, with a preferred time in step (c) being from 15 minutes to 24 hours, more preferably 15 minutes to 2 hours even more preferably 15 minutes to 1 hour.

The heat treatment profile may range from approximately 100° C. to 750° C., preferably approximately 100° C. to 650° C., more preferably 100° C. to 300° C. It will be appreciated that the heat treatment profile selected will depend on the particular composition of the complex oxide being treated.

The heat treatment step is preferably conducted under increased oxygen conditions. This may be achieved by providing a suitable airflow within the heating environment.

In a preferred embodiment, the heat treatment should encourage penetration of oxygen into the particles during the carbon burnout phase. Preferred equipment includes fluid bed furnaces and the like. A smaller oxide or oxide precursor/carbon particle size also encourages penetration of oxygen. Applicants have found that better penetration of oxygen leads to better thermal stabilities. Without being held to any particular theory, applicants believe that better oxygen penetration leads to more complete removal of carbon at a lower temperature, and thus maintains a more oxidising atmosphere. Less oxygen leads to retention of carbon at higher temperature, and trapping of reducing gases such as carbon monoxide, leading to a very reducing environment. This may lead to some metal formation and retention of this metal to quite high temperatures, which can cause sintering and loss of surface area. Oxygen penetration can be encouraged by causing the oxides to move relative to an oxygen-containing atmosphere to thereby reduce the thickness of the boundary layer around the oxides and thus increase the rate of diffusion of oxygen into the oxide. Processing the oxides in a fluidised bed furnace or in a furnace having an oxygen-containing atmosphere flowing therethrough is suitable.

Furthermore, a heat treatment that allows burn out of carbon at lower temperatures eg. at temperatures of approximately 100° C. to 750° C., preferably approximately 100° C. to 650° C., more preferably approximately 100° C. to 300° C. is preferred. Burn out at sufficiently high temperatures can cause an uncontrolled exothermic burn off of the carbon, which severely diminishes the surface area. Also applicants believe that retention of carbon to high temperatures diminishes high temperature stability by the mechanisms previously discussed.

Close control of the burn out step should be maintained in order to avoid excursions out of the desired temperature profile of the burnout step. For example, close monitoring of the temperature during burn out could be used. If an undesired increase in the temperature is observed (indicating excess energy production due to an increase in the rate of exothermic burning of carbon), the atmosphere supplied to the furnace may be controlled by reducing the partial pressure of oxygen. One way of achieving this outcome is to inject extra nitrogen or other inert or non-reactive gas. This not only reduces the partial pressure of oxygen, it also acts to cool the furnace. As it is also desired to maintain an oxidizing atmosphere during burn out of the carbon containing pore formers, this method of controlling the temperature should be used only where rapid response to an impending temperature excursion is required, or where it is apparent that an excursion has occurred and it is necessary to quickly reduce or stop the oxidation of carbon (for example, for safety reasons). Alternatively, additional cooling may be provided. Instead of closely monitoring the temperature during burn out, it may also be possible to obtain satisfactory results by maintaining the temperature during burn out below a specified maximum temperature. The specified maximum temperature can vary widely in accordance with the particular complex metal oxide being formed. As a further alternative, the method of the present invention may be operated under specified operating conditions (such as oxygen flow rate and furnace cooling) and a quality control protocol maintained that rejects any unacceptable product. The presence of unacceptable product may be determined by testing of the product or by a monitoring technique that monitors one or more operating parameters and rejects any product formed if the one or more parameters moves outside of a specified range of values. For example, a simple thermocouple may be used to monitor the maximum temperature reached during the method and if the maximum temperature exceeds a specified maximum, the product may be rejected, or if a visual inspection shows that the mixture or product is red hot during processing, the product may be rejected.

In a second aspect of the present invention, there is provided a porous complex oxide material, wherein the complex oxide material exhibits high temperature stability and including an oxide composition represented by the general formula:

$$A_{1-x}B_xMO_3$$

wherein

A is a mixture of lanthanide elements;

B is a divalent or monovalent cation;

M is an element or mixture of elements selected from the group consisting of elements of an atomic number from 22 to 32, 40 to 51, and 73 to 83; and x is a number in the range $0.1 \leqq x \leqq 0.5$.

Preferably, the complex oxide material is made by the method of the first aspect of the present invention.

The complex oxide material may be of the correct phase (e.g. single phase or multiple phase) with an initial surface area greater than approximately 15 m²/g, preferably greater than approximately 20 m²/g, more preferably greater than approximately 30 m²/g, and a surface area after ageing for 2 hours at 1000° C. in air greater than approximately 5 m²/g, preferably greater than approximately 10 m²/g, more preferably greater than approximately 15 m²/g.

The complex oxide material may exhibit a substantially homogeneous composition.

The complex oxide material may include a perovskite material.

The complex oxide material may generally exhibit an average grain size of approximately 2 nm to approximately 150 nm, preferably approximately 2 to 100 nm and has pores ranging in size from approximately 7 nm to approximately 250 nm, more preferably approximately 10 nm to approximately 150 nm. However, the average grain and pore size of the complex oxide materials may vary, depending on the specific complex oxide selected.

For example, for a complex oxide material of the $CeZrO_2$ type, average grain size may preferably fall at the lower end of the range, e.g. at approximately 2 to 50 nm, more preferably approximately 2 to 10 nm, with pores in the range of approximately 7 nm to 50 nm, more preferably approximately 7 nm to 30 nm.

A complex oxide material of the lanthanum manganate type may exhibit an average grain size of approximately 2 nm to 100 nm, more preferably approximately 2 to 30 nm, with pores in the range of approximately 15 nm to 200 nm, more preferably approximately 15 nm to 150 nm.

More preferably, the complex oxide material may exhibit a substantially disperse pore size range.

In a third aspect the present invention provides a method of producing porous non-refractory metal oxide, the method including providing a mixture of
a) one or more precursor elements suitable to produce the non-refractory metal oxide, particles of non-refractory oxide, oxide particles that are precursors of the non-refractory oxides, or mixtures of two or more thereof; and
b) a particulate carbon-containing pore-forming material selected to provide pore sizes in the range of approximately 7 nm to 250 nm,
and treating the mixture to
i) form the porous non-refractory metal oxide and the non-refractory metal oxide has grain sizes in the range of about 1 nm to 150 nm; and
ii) remove the pore-forming material under conditions such that the porous structure and composition of the non-refractory metal oxide is substantially preserved.

Suitably, in step (i) above, one or more of the precursor elements from (a) above are incorporated into a phase of the non-refractory metal oxide.

The one or more precursor elements may include one or more metal compounds including one or more metals selected from those metals of atomic number 3, 4, 11, 19-21, 23-32, 37-39, 41-51, 55-84 and 87-103. The one or more metal compounds may be oxides, acetates, carbonates, nitrates and the like.

Unlike the first aspect of the present invention, the method of the third aspect of the present invention encompasses the formation of porous metal oxides of the specified grain size and pore size that has only a single metal in the oxide phase (i.e. not a complex oxide). However, the third aspect of the present invention is restricted to forming non-refractory metal oxides. It is a very surprising result that such non-refractory metal oxides can be formed in this manner because the presence of the carbon-containing pore forming particles was thought to be likely to cause reduction of the non-refractory metal oxide during the step of removing the pore forming particles which, of course, would destroy or substantially compromise the metal oxide phase. However, the present inventors have discovered that the method of the third aspect of the present invention can, in fact, form such non-refractory metal oxides.

In one embodiment, the method of the third aspect of the present invention provides the precursor element(s) as a solution or dispersion. For example, a solid phase mixture may first be formed and then dispersed or dissolved in a suitable solvent.

In one embodiment the precursor elements and pore-forming material may be mixed to form a solid phase mixture and the oxide being subsequently formed by suitable heat treatment, as discussed below.

In a further embodiment, oxide particles may be formed from suitable precursor elements and the pore-forming material mixed with the oxide particles to form a mixture.

The mixture may alternatively be provided as a solution or dispersion. For example, a solid phase mixture may first be formed and then dispersed or dissolved in a suitable solvent.

In a further embodiment, the precursor element(s) may first be formed in solution and the pore-forming material subsequently added to the solution. Alternatively the precursor elements and at least a portion of pore-forming material may be mixed to form a solid phase mixture and the mixture dissolved in a suitable solvent.

Where a dispersion or solution is formed, any suitable solvent may be used. Although inorganic and organic solvents, such as acids (e.g. hydrochloric or nitric acid), ammonia, alcohols, ethers and ketones may be used, water is the preferred solvent.

The method of the third aspect of the present invention is especially suitable for use in methods for making metal oxides in which a solution containing one or more precursors is mixed with a surfactant or a polymer and is subsequently treated, typically by heating, to form the metal oxide.

Other features of embodiments of the third aspect of the present invention are as described with reference to various embodiments of the present invention and, for convenience and brevity, need not be described again.

The method of the third aspect of the present invention has been used to make copper oxide that exhibits a large specific surface area. Other oxides, both complex oxides and oxides containing a single metal species, have also been made by the method of the second aspect of the invention.

The methods of the first and third aspects of the present invention are particularly suited to making metal oxide powders.

DESCRIPTION OF THE DRAWINGS

FIG. 1 shows pore size distributions from materials prepared in Examples 1 and 2, following heat treatment to 650° C.;

FIG. 2 shows surface areas obtained after heat treatment at 650° C. and 800° C., as a function of $La_2O_3$ content for examples 18-22;

FIG. 3 shows pore volumes obtained after heat treatment at 650° C. as a function of $La_2O_3$ content for examples 18-22

EXAMPLES

Example 1

Figure 4A:
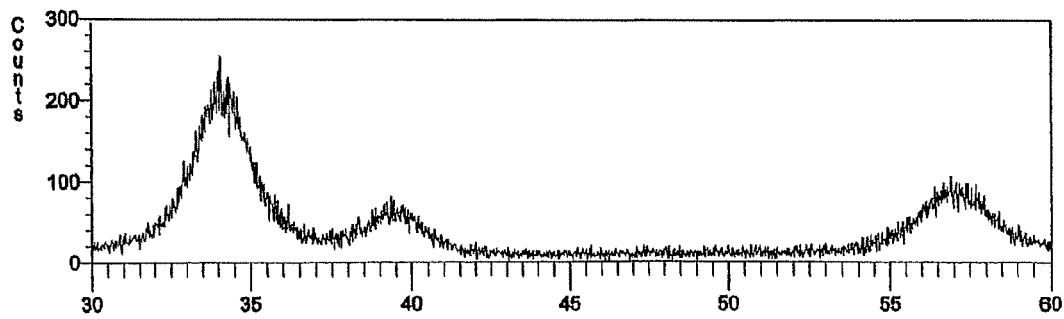
FIGS. 4a and 4b show XRD patterns of $Ce0.45Zr0.45La0.1Ox$ heat treated to 450° C. a) prepared without carbon (example 28) and b) with carbon (example 29)

$La_{0.8}Sr_{0.2}Ni_{0.04}Pd_{0.06}Mn_{0.9}O_3$ was prepared according to the following method. A solution was prepared by dissolving 149 g $La(NO_3)_3.6H_2O$, 18.2 g $Sr(NO_3)_2$, 6.86 g $Pd(NO_3)_2.xH_2O$, 2.04 g $NiCO_3$ and 138.3 g of $Mn(NO_3)_2$ in water solution containing 233 g/l Mn, in a solution comprised of 135 g water and 12 g $HNO_3$(70%). 119 g of this solution was mixed with 72 g Brij 30 surfactant. The mixture was heated slowly to 300° C. The dried product was then heat-treated 0.5 h at 300° C., 350° C., 400° C., 450° C., 500° C., 600° C. and 650° C. in a tube furnace with airflow.

XRD showed the material was single-phase perovskite. The surface area obtained after this heat treatment was 17.8 $m^2/g$. FIG. 1 shows the pore size distribution. TEM showed the average grain size was ~50 nm. After heat treatment for 2 h at 1000° C., the surface area was 6.9 $m^2/g$.

Example 2

$La_{0.8}Sr_{0.2}Ni_{0.04}Pd_{0.06}Mn_{0.9}O_3$ was prepared in the same manner as example 1, except that 16.15 g of carbon black (Cabot Monarch 1300, average primary particle size 13 nm, DBP oil absorption 100 cc/g, nitrogen surface area 560 m$^2$/g) was mixed into the solution with a magnetic stirrer, prior to mixing with surfactant. This solution/carbon black mixture was dispersed by a high-speed shearer, then mixed with surfactant, then dispersed again. The heat treatment applied was identical to example 1.

XRD showed the material was single-phase perovskite. The surface area obtained after the heat treatment was 24.7 m$^2$/g. FIG. 1 shows the pore size distribution. TEM showed the average grain size was ~50 nm. After heat treatment for 2 h at 1000° C., the surface area was 10.04 m$^2$/g.

It will be noted that incorporation of the carbon black has provided significantly more large pores, and the material is more stable at high temperature.

Example 3

$La_{0.8}Sr_{0.2}Ni_{0.04}Pd_{0.06}Mn_{0.9}O_3$ was prepared in the same manner as example 2, except that the heat treatment consisted of placing material heated to 300° C. directly at 1000° C. After heat treatment for 2 h at 1000° C., the surface area was 1.9 m$^2$/g.

This example shows that incorporation of carbon black in the perovskite precursor is not in itself sufficient to provide high temperature stability. The heat treatment conditions used in this example caused the destruction of the surface area of the material. It is postulated that the large step change in temperature used in this example caused an uncontrolled burnout of carbon from the oxide, which led to localised regions of very high temperature. This is postulated to have caused sintering and reduction of the metal oxide. In other words, the composition and pore structure of the metal oxide was not maintained during carbon burn out.

Example 4

$La_{0.8}Sr_{0.2}Ni_{0.04}Pd_{0.06}Mn_{0.9}O_3$ was prepared in the same manner as example 3, except that no airflow was present in the tube furnace. The remainder of the procedure was the same.

XRD showed the material was perovskite phase. The full width half maximum (FWHM) of the peaks was similar to FWHMs of peaks in examples 1 and 2, indicating that the grain sizes were similar (i.e. around 50 nm). The surface area obtained after this heat treatment was 22.1 m$^2$/g. After heat treatment for 2 h at 1000° C., the surface area was 9.1 m$^2$/g.

Comparison of this result with that from example 2 (10.2 m$^2$/g) shows the beneficial effect of increased oxygen during the heat treatment. The present inventors believe that less oxygen provides reducing conditions in the furnace, which can lead to formation of metal in the material. This can cause sintering and a reduction in surface area and pores.

Examples 5-8

$La_{0.8}Sr_{0.2}Ni_{0.04}Pd_{0.06}Mn_{0.9}O_3$ was prepared in similar manner to example 2, with varying amounts of carbon black (Raven 850).

XRD showed the materials were perovskite phase, and peak FWHMs were similar to examples 1 and 2.

The surface areas, pore volumes and pore size distributions are shown in Table 1 and were clearly dependent upon the amount of carbon black used.

TABLE 1

| Example | Amount of carbon black (g) | Surface area at 650° C. (m$^2$/g) | Pore volume 2-200 nm dia. (cc · g) | Pore volume 10-200 nm dia. (cc · g) | Pore volume 50-200 nm dia. (cc · g) |
| --- | --- | --- | --- | --- | --- |
| 5 | 8 | 37 | 0.22 | 0.2 | 0.1 |
| 6 | 16 | 44 | 0.33 | 0.31 | 0.18 |
| 7 | 32 | 44 | 0.34 | 0.32 | 0.22 |
| 8 | 48 | 51 | 0.41 | 0.39 | 0.25 |

Examples 9-11 $La_{0.8}Sr_{0.2}Ni_{0.04}Pd_{0.06}Mn_{0.9}O_3$ Examples with Different Carbon Blacks Examples showing the effect of using different types of carbon black pore formers on surface areas and pore structures obtained for the complex oxide $La_{0.8}Sr_{0.2}Ni_{0.04}Pd_{0.06}Mn_{0.9}O_3$.

Oxides were formed using the method described in example 2, except that different types of carbon black were used.

XRD showed that all compounds were perovskite structure, and peak FWHMs were similar to examples 1 and 2 indicating that the grain sizes were around 50 nm. Results for surface areas and pore structures obtained are shown in Table 2.

TABLE 2

| | | Carbon Black | | Surface Area m$^2$/g | | Pore Volumes cc/g | | |
| --- | --- | --- | --- | --- | --- | --- | --- | --- |
| | | Particle Size | Oil Absorption | | | | | |
| Example | Type | (nm) | (cc/g) | 650° C. | 1000° C. | 3-200 nm | >10 nm | >50 nm |
| 9 | Monarch 280 | 45 | 137 | 25 | 11.3 | 0.17 | 0.16 | 0.10 |
| 10 | Monarch 1300 | 13 | 100 | 23 | 9.8 | 0.22 | 0.21 | 0.14 |
| 11 | Mogul L | 24 | 62 | 32 | 12.0 | 0.25 | 0.23 | 0.16 |

Examples 12-13

In examples 12 and 13, $La_{0.8}Sr_{0.2}Ni_{0.04}Pd_{0.08}Mn_{0.9}O_3$ was prepared in the same manner as examples 1 and 2 respectively (without carbon and with carbon) except that polyethylene glycol (molecular weight 4000) was used instead of surfactant. XRDs showed perovskite phase, and a minor impurity peak example 12. The surface areas and pore volumes are shown in table 3. The incorporation of carbon has clearly increased the number of larger pores.

TABLE 3

| Example | Surface Area m$^2$/g 650° C. | Pore Volumes cc/g | | |
|---|---|---|---|---|
| | | 3-200 nm | >10 nm | >50 nm |
| 12 | 17.5 | 0.12 | 0.105 | 0.04 |
| 13 | 31.7 | 0.22 | 0.2 | 0.15 |

Examples 14-15

$La_{0.8}Sr_{0.2}Ni_{0.04}Pd_{0.06}Mn_{0.9}O_3$ was prepared via a co-precipitation technique, examples 14 and 15 carried out with and without carbon (17.8 g Monarch 1300), respectively. A solution was prepared in the same manner as example 1. Another solution was prepared by dissolving 55 g of ammonium oxalate in 960 g of water. These solutions were combined by slowly adding each solution into a stirred vessel to produce precipitates. The precipitates were washed, filtered and dried at ~100° C., then heat treated in the same manner as example 1.

XRDs showed perovskite phase and some separate peaks. The surface areas and pore volumes are shown in table 4.

Clearly the effect of carbon on the pore distribution is very much smaller than observed in the examples using surfactant and polyethylene glycol. Without being held to any particular theory, the inventors believe that the larger liquid volumes, often required for co-precipitation, result in very disperse precipitate particles and carbon particles. This may make it very difficult to sufficiently disperse the carbon particles amongst the precipitates to produce the desired pores.

TABLE 4

| Example | Surface Area m$^2$/g 650° C. | Pore Volumes cc/g | | |
|---|---|---|---|---|
| | | 3-200 nm | >10 nm | >50 nm |
| 14 | 19 | 0.105 | 0.09 | 0.025 |
| 15 | 17 | 0.115 | 0.11 | 0.06 |

Examples 16-21 $Ce_{0.54}Zr_{0.37}La_{0.03}Pr_{0.06}O_x$
Examples with Different Types of Carbon Black These examples show the effect of using different types of carbon black pore formers on surface areas and pore structures obtained for the complex oxide $Ce_{0.54}Zr_{0.37}La_{0.03}Pr_{0.06}O_x$.

Oxides of composition $Ce_{0.54}Zr_{0.37}La_{0.03}Pr_{0.06}O_x$ were prepared by dissolving appropriate amounts of cerium nitrate, zirconium carbonate, lanthanum nitrate and praseodymium nitrate in a water/nitric acid solution. 33 g of carbon black was dispersed in the solution using a high speed shearer, 70 g of Erunon LA4 surfactant was added and the mixture was dispersed again. The mixture was heated slowly to 300° C. The dried product was then heat-treated for 0.5 h at 300° C., 350° C., 400° C., 450° C., 500° C., 600° C. and 650° C. in a tube furnace with airflow.

XRD showed the samples were single phase, and TEM showed the average grain size of the material prepared in these examples to be approximately 5-10 nm after heating to 650° C. Other examples exhibited similar XRD peak FWHMs, indicating similar grain sizes.

Surface areas and pore volumes for the samples with different carbon blacks are shown in Table 5 below, together with particle size and oil absorption values for the carbon blacks. Also shown are surface areas obtained after heat treatment for 2 h at 1000° C.

TABLE 5

| | | Carbon Black | | | | | | |
|---|---|---|---|---|---|---|---|---|
| | | Particle Size | Oil Absorption | Surface Area m$^2$/g | | Pore Volumes cc/g | | |
| Example | Type | (nm) | (cc/g) | 650° C. | 1000° C. | 3-200 nm | >10 nm | >50 nm |
| 12 | Monarch 280 | 45 | 137 | 101 | 13.9 | 0.3 | 0.2 | 0.12 |
| 13 | Raven 2500 | 13 | 65 | 112 | 17 | 0.41 | 0.32 | 0.14 |
| 14 | Raven 1190 | 21 | 62 | 116 | 18.4 | 0.43 | 0.33 | 0.17 |
| 15 | Raven 410 | 101 | 68 | 108 | 12.7 | 0.28 | 0.175 | 0.09 |
| 16 | Raven 850 | 34 | 75 | 110 | 19.5 | 0.38 | 0.33 | 0.15 |
| 17 | Raven 460 | 67 | 61 | 99 | 18.3 | 0.40 | 0.3 | 0.17 |

Clearly the pore structure and surface area can be altered by use of carbon blacks with different morphological features.

Examples 22-26 Examples with Excess La Content $La_{0.8}Sr_{0.2}Mn_{0.9}Ni_{0.04}Pd_{0.06}O_3 + La_2O_3$ materials were prepared in a similar manner to previous examples. The amount of $La_2O_3$ was varied between 2.5 wt % and 20 wt %. XRD showed perovskite phase, plus increasing amounts of $La_2O_3$ phase with increasing excess $La_2O_3$. FIGS. 2 and 3 show surface areas obtained after heat treatment at 650° C. and 800° C., as a function of $La_2O_3$ content.

This example illustrates that the pore structure of the oxide composition may be altered by incorporation of varying amounts of a second phase.

Example 27 Excess $CeO_2$ (7b)

$La_{0.8}Sr_{0.2}Ni_{0.04}Pd_{0.06}Mn_{0.9}O_3 + 10$ wt % $CeO_2$ was made in a similar manner to example 1. This composition was chosen specifically to provide a perovskite phase and a separate $CeO_2$ phase (this amount of excess $CeO_2$ is unable to be incorporated into the perovskite phase). XRD showed the material was perovskite phase and $CeO_2$. The surface area obtained was 28.9 m$^2$/g, and the volume of pores between 3 nm and 200 nm was 0.26 cc/g, between 10 nm and 200 nm the pore volume was ~0.25 cc/g, and between 50 nm and 200 nm it was ~0.175 cc/g. After heat treatment for 2 h at 1000° C. the surface area was 11.7 m$^2$/g.

Examples 28 and 29 $Ce_{0.45}Zr_{0.45}La_{0.1}O_x$ Via Hydrothermal Method $Ce_{0.45}Zr_{0.45}La_{0.1}O_x$ was prepared using a hydrothermal method similar to known methods for similar compounds.

Figure 4B:
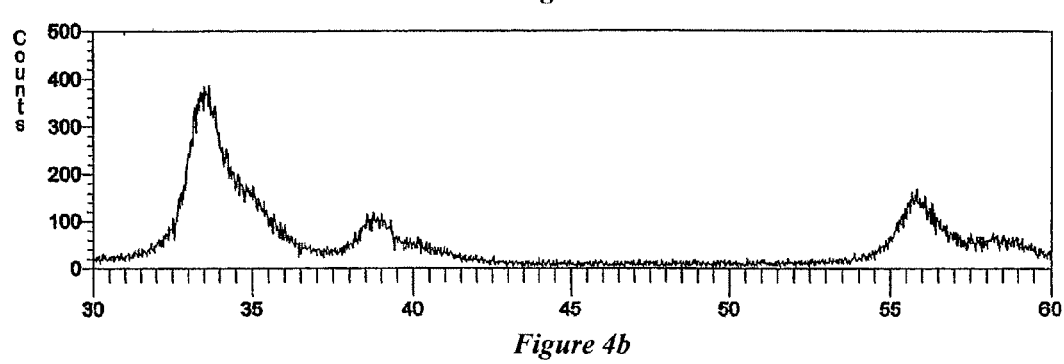

49.3 g of cerium (IV) ammonium nitrate, 27.4 g of zirconium carbonate and 8.66 g of lanthanum nitrate were dissolved in a solution containing 940 g water and 63 g nitric acid (70%). This mixture was heated for ~24 h at ~95° C., causing precipitates to form. 150 ml of ammonia solution (%) was finally added and the precipitates were washed, separated via filtration, and dried at ~100° C. Heat treatment was then carried out. The temperature was increased from 150° C., with 0.5 h steps at 150° C., 200° C., 250° C., 300° C., 350° C., 400° C., and 450° C. The surface area following this heat treatment was 145 m$^2$/g. Pore volumes are shown in table 6 and the XRD is shown in FIG. 4.

Comparative Example 29

Figure 5A:
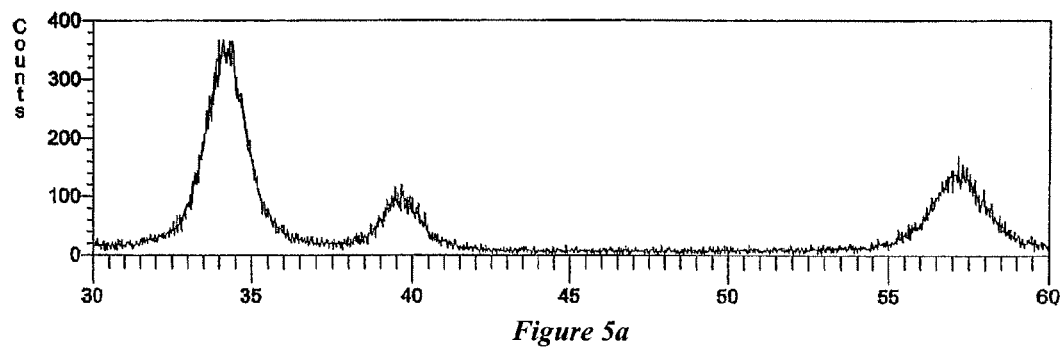
FIGS. 5a and 5b show XRD patterns of $Ce0.45Zr0.45La0.1Ox$ heat treated to 800° C. a) prepared without carbon (example 28) and b) with carbon (example 29)
Figure 5B:
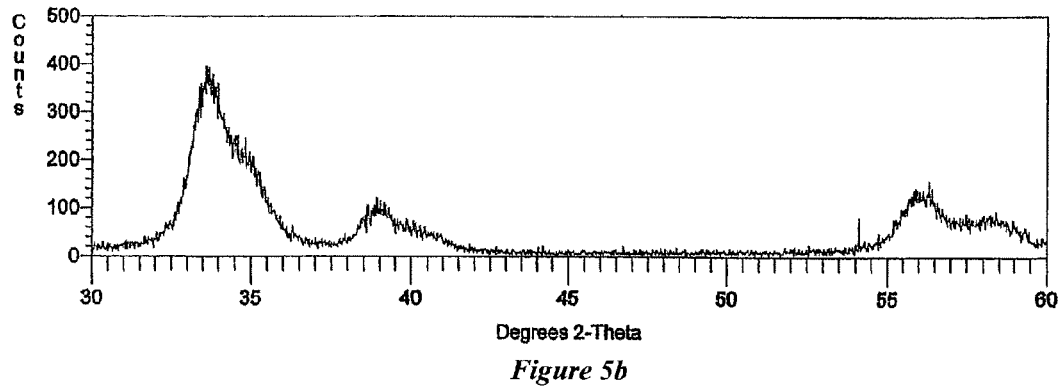

$Ce_{0.45}Zr_{0.45}La_{0.1}O_x$ was prepared In the same manner as example 28 except that 32 g of Raven 850 carbon black was added to the solution and dispersed with a high speed shearer. The hydrothermal heating and heat treatments were then carried out in the same manner. The surface area of this sample was ~100 m$^2$/g. Pore volumes are shown in Table 6 and the XRD is shown in FIG. 4. In comparison to example 28, it can be seen that incorporation of carbon has increased the volume of larger pores. However the XRDs show that the incorporation of carbon has resulted in the formation of an oxide having somewhat separated phases that are ceria-rich and zirconia-rich. This is demonstrated by the double peaks, with the separate peaks shifted towards the $CeO_2$ and $ZrO_2$ peak positions. Thus the carbon has affected the hydrothermal precipitation process, causing significant separation of the different elemental species and increasing the pore volume. This effect is shown even more clearly in FIG. 5, which shows XRDs of both example compounds that were given an additional heat treatment of 0.5 h at 800° C.

TABLE 6

| Example | Surface Area m$^2$/g 650° C. | Pore Volumes cc/g | | |
|---|---|---|---|---|
| | | 3-200 nm | >10 nm | >50 nm |
| 28 | 145 | 0.2 | 0.04 | 0 |
| 29 | 100 | 0.39 | 0.31 | 0.15 |

Examples 30-32 CuO

CuO was made using similar methods to previous examples. Example 30 was heat treated slowly to 350° C., with 0.5 h holds at 150° C., 200° C., 250° C., 300° C. and 350° C. Example 31 was heat treated similarly, however it was observed that this sample considerably overheated during heat treatment, exhibiting a red glow in areas indicating that the sample experienced much higher temperatures than 350° C. Example 32 had a slower heat treatment, with an additional step for 1 h at 225° C. This heat treatment was found to produce material with more consistent properties and high temperature excursions were not observed.

XRDs for all materials exhibited CuO phase only. The surface areas and pore volumes obtained are listed in Table 7.

TABLE 7

| Example | Surface Area m$^2$/g 650° C. | Pore Volumes cc/g | | |
|---|---|---|---|---|
| | | 3-200 nm | >10 nm | >50 nm |
| 30 | 95 | 0.2 | 0.11 | 0.04 |
| 31 | 57.4 | 0.13 | 0.1 | 0.04 |
| 32 | 130 | 0.25 | 0.18 | 0.065 |

These examples show, surprisingly, heat-sensitive materials can be produced using the methods of the present invention, using appropriate heat treatment.

It will be understood that the Invention disclosed and defined in this specification extends to all alternative combinations of two or more of the individual features mentioned or evident from the text or drawings. All of these different combinations constitute various alternative aspects of the invention.

It will also be understood that the term "comprises" (or its grammatical variants) as used in this specification is equivalent to the term "includes" and should not be taken as excluding the presence of other elements or features.

The invention claimed is:

1. A method of producing porous complex oxides comprising a metal oxide phase containing two or more metallic elements homogeneously distributed in the oxide phase, at least one of the metals selected from a non-refractory metal selected from metals of atomic number 3, 4, 11, 19-21, 23-32, 37-39, 41-51, 55-84 and 87-103, the method including forming a mixture of:
   a) precursor elements suitable to produce the complex oxide; or
   b) one or more precursor elements suitable to produce particles of the complex oxide and one or more metal oxide particles;
   wherein at least one of the precursor elements is present in the form of a solution; and
   c) a solid particulate carbon-containing pore-forming material selected to provide pore sizes in the range of approximately 7 nm to 250 nm, said solid particulate carbon-containing pore-forming material being dispersed throughout the mixture; and
   d) one or more surfactants present in an amount sufficient to form micelles;
   and heating the mixture to
   (i) form the porous complex oxide in which two or more of the precursor elements from (a) above or one or more of the precursor elements and one or more of the metals in the metal oxide particles from (b) above are incorporated into a phase of the complex metal oxide and the complex metal oxide has grain sizes in the range of about 1 nm to 150 nm; and
   (ii) remove the pore-forming material under conditions such that the porous structure and composition of the complex oxide is substantially preserved to obtain a complex metal oxide having a porous structure including pores sized in the range of approximately 7 nm to 250 nm.

2. A method as claimed in claim 1 wherein the method includes the steps of
   a) preparing a solution containing one or more metal cations;
   b) mixing the solution from step (a) with surfactant under conditions such that surfactant micelles are formed within the solution to thereby form a micellar liquid; and
   c) heating the micellar liquid from step b) above to form metal oxide, the heating step being undertaken at a temperature and for a period of time to remove the surfactant and thereby form metal oxide particles having a disordered pore structure,
   wherein carbon black particles are added either to the solution from a), or the mixture from b), and the heat treatment also substantially removes (burns out) the carbon black particles.

3. A method as claimed in claim 2 wherein the carbon particles are added to the solution of step a), prior to mixing.

4. A method as claimed in claim 1 wherein the step of heating the mixture to form the complex metal oxide and remove the carbon-containing particles comprises heating the mixture to a temperature in the range of from about 100° C. to about 750° C.

5. A method as claimed in claim 1 wherein one or more of temperature, cooling rate or partial pressure of oxygen is controlled during the heating step to minimize or avoid reduction of the complex metal oxide during removal of the carbon-containing particles.

6. A method as claimed in claim 5 wherein the temperature is controlled such that a specified maximum temperature is not exceeded during removal of the carbon-containing particles.

7. A method as claimed in claim 1, wherein the solid pore-forming particles are dispersed in the mixture using a method selected from high-speed shearing, ultrasonic mixing, roll milling, ball milling or sand milling.

8. A method as claimed in claim 1, wherein the pore-forming material has a particle size falling in the range of from about 7 nm to about 300 nm.

9. A method as claimed in claim 1, wherein the complex metal oxide that is formed is selected from the group consisting of a single phase complex metal oxide, a phase of a complex metal oxide and one or more phases of other metal oxides, and two or more complex metal oxide phases, either with or without any other metal oxide phases.

10. A method as claimed in claim 9, wherein each complex metal oxide phase that is formed is a phase pure phase.

11. A method as claimed in claim 1, wherein the pore-forming particles have a particle size in the range of approximately 10 nm to 150 nm.

12. A method as claimed in claim 1 wherein components used to form the complex oxide are homogeneously dispersed to form the mixture of precursor elements.

13. A method as claimed in claim 1 wherein air is removed from the carbon-containing pore forming particles by vacuum, prior to forming the mixture.

\* \* \* \* \*